(12) United States Patent
MacLaughlin

(10) Patent No.: US 9,939,295 B2
(45) Date of Patent: *Apr. 10, 2018

(54) IMPACT PROTECTION FOR WIRELESS DIGITAL DETECTOR GLASS PANEL

(71) Applicant: Carestream Health, Inc., Rochester, NY (US)

(72) Inventor: Scott T. MacLaughlin, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,357

(22) Filed: Feb. 28, 2017

(65) Prior Publication Data

US 2017/0167900 A1    Jun. 15, 2017

Related U.S. Application Data

(63) Continuation-in-part of application No. 14/571,527, filed on Dec. 16, 2014, now Pat. No. 9,581,701.

(51) Int. Cl.
*G01J 1/00* (2006.01)
*G01D 11/26* (2006.01)

(52) U.S. Cl.
CPC .................. *G01D 11/26* (2013.01)

(58) Field of Classification Search
CPC ............. G02F 2001/133331; G01D 11/26
USPC .................................................... 250/336.1
See application file for complete search history.

(56) References Cited

U.S. PATENT DOCUMENTS

| | | | |
|---|---|---|---|
| 3,562,366 A | 2/1971 | Sohl | |
| 3,914,145 A | 10/1975 | Forler et al. | |
| 4,544,575 A * | 10/1985 | Melchior | B32B 17/10036 |
| | | | 156/327 |
| 5,804,832 A * | 9/1998 | Crowell | G01T 1/24 |
| | | | 250/370.09 |
| 6,278,118 B1 | 8/2001 | Homme et al. | |
| 7,189,972 B2 | 3/2007 | Ertel et al. | |
| 7,211,942 B1 * | 5/2007 | Ogawa | C09K 11/7733 |
| | | | 250/483.1 |
| 8,569,704 B2 | 10/2013 | Tredwell | |
| 8,642,173 B2 | 2/2014 | O'Donnell | |
| 8,772,728 B2 | 7/2014 | Tredwell | |

(Continued)

FOREIGN PATENT DOCUMENTS

| | | |
|---|---|---|
| EP | 2891552 A1 | 7/2015 |
| EP | 2901884 A1 | 8/2015 |

(Continued)

OTHER PUBLICATIONS

R.A. Allaire, et al., Fracture Analysis of the Glass Scoring Process—Technical Paper, Corning—Display Technologies, Nov. 2004, 5 pages, TIP 308.

(Continued)

*Primary Examiner* — Taeho Jo

(57) ABSTRACT

A digital radiography detector has a substrate that is enclosed by a housing and that has, formed on a first surface, photosensitive circuitry that provides image data of a subject in response to ionizing radiation passed through the subject, wherein a second surface on the exterior of the detector has a multilayer flexible cover sheet configured to absorb impact force against the detector.

16 Claims, 11 Drawing Sheets

(56) References Cited

U.S. PATENT DOCUMENTS

| | | | |
|---|---|---|---|
| 9,211,565 B2* | 12/2015 | Jagannathan | B05D 3/12 |
| 9,293,808 B1 | 3/2016 | Roberts et al. | |
| 9,469,469 B2* | 10/2016 | Rayner | G06F 1/1626 |
| 9,526,320 B2 | 12/2016 | Roberts et al. | |
| 2002/0025441 A1* | 2/2002 | Hieda | B32B 17/10018 |
| | | | 428/440 |
| 2002/0166977 A1* | 11/2002 | Kohda | G03B 42/08 |
| | | | 250/484.4 |
| 2003/0071228 A1 | 4/2003 | Bergh et al. | |
| 2003/0146395 A1* | 8/2003 | Fukui | G03B 42/08 |
| | | | 250/484.4 |
| 2003/0183749 A1 | 10/2003 | Tsutsui et al. | |
| 2003/0183777 A1 | 10/2003 | Struye et al. | |
| 2004/0052080 A1* | 3/2004 | Hieda | B32B 15/06 |
| | | | 362/382 |
| 2004/0070328 A1* | 4/2004 | Van den Bergh | B32B 15/08 |
| | | | 313/461 |
| 2004/0124362 A1* | 7/2004 | Hennessy | G01T 1/2002 |
| | | | 250/370.11 |
| 2004/0231873 A1* | 11/2004 | Shimamura | H01J 5/08 |
| | | | 174/394 |
| 2005/0139783 A1* | 6/2005 | Kubota | G03B 42/08 |
| | | | 250/484.4 |
| 2005/0274916 A1* | 12/2005 | Shoji | B32B 3/00 |
| | | | 250/580 |
| 2006/0261286 A1 | 11/2006 | Homme et al. | |
| 2007/0001567 A1* | 1/2007 | D'Haene | B32B 23/08 |
| | | | 313/112 |
| 2007/0138400 A1* | 6/2007 | Ertel | G01T 1/1644 |
| | | | 250/370.11 |
| 2007/0290146 A1* | 12/2007 | Fukui | G21K 4/00 |
| | | | 250/484.4 |
| 2008/0011961 A1 | 1/2008 | Shoji et al. | |
| 2008/0026334 A1 | 1/2008 | Williamson et al. | |
| 2008/0035859 A1 | 2/2008 | Molteni et al. | |
| 2008/0078939 A1* | 4/2008 | Hennessy | A61B 6/4233 |
| | | | 250/370.09 |
| 2008/0078940 A1* | 4/2008 | Castleberry | G01T 1/2018 |
| | | | 250/370.09 |
| 2008/0107887 A1* | 5/2008 | Kim | C09J 7/0296 |
| | | | 428/304.4 |
| 2008/0149852 A1 | 6/2008 | Shoji et al. | |
| 2008/0157001 A1 | 7/2008 | Kudo et al. | |
| 2008/0309237 A1* | 12/2008 | Hori | G09G 3/2944 |
| | | | 313/582 |
| 2009/0014659 A1* | 1/2009 | Hennessy | G03B 42/04 |
| | | | 250/370.09 |
| 2009/0067582 A1 | 3/2009 | Feke | |
| 2009/0122959 A1* | 5/2009 | Jadrich | G01T 1/20 |
| | | | 378/91 |
| 2009/0130157 A1* | 5/2009 | Ylitalo | A01N 25/34 |
| | | | 424/405 |
| 2010/0086729 A1* | 4/2010 | Long | B32B 15/08 |
| | | | 428/116 |
| 2010/0211353 A1 | 8/2010 | Volckers | |
| 2011/0024642 A1 | 2/2011 | Tredwell et al. | |
| 2011/0049371 A1* | 3/2011 | Kobayashi | G01T 1/2018 |
| | | | 250/361 R |
| 2011/0310470 A1* | 12/2011 | Horie | G02F 1/133502 |
| | | | 359/352 |
| 2012/0153172 A1* | 6/2012 | Sumi | G01T 1/244 |
| | | | 250/369 |
| 2012/0168632 A1* | 7/2012 | Yagi | A61B 6/4233 |
| | | | 250/366 |
| 2012/0169639 A1* | 7/2012 | Tu | G02B 5/208 |
| | | | 345/173 |
| 2013/0004372 A1 | 1/2013 | O'Donnell | |
| 2013/0045371 A1 | 2/2013 | O'Donnell | |
| 2013/0068634 A1* | 3/2013 | Hynecek | B29D 22/003 |
| | | | 206/37 |
| 2013/0105696 A1 | 5/2013 | Shaw et al. | |
| 2013/0220514 A1 | 8/2013 | Jagannathan et al. | |
| 2013/0221229 A1* | 8/2013 | Jagannathan | B05D 3/12 |
| | | | 250/366 |
| 2013/0323444 A1* | 12/2013 | Ehemann | C03C 21/002 |
| | | | 428/34.4 |
| 2014/0061481 A1* | 3/2014 | Kondo | G01T 1/202 |
| | | | 250/361 R |
| 2014/0134412 A1 | 5/2014 | O'Donnell | |
| 2014/0152890 A1* | 6/2014 | Rayner | G06F 1/1626 |
| | | | 348/376 |
| 2015/0008330 A1 | 1/2015 | MacLaughlin et al. | |
| 2015/0048259 A1 | 2/2015 | Yamamoto et al. | |
| 2015/0168568 A1 | 6/2015 | Jonishi et al. | |
| 2015/0194996 A1 | 7/2015 | Roberts et al. | |
| 2015/0195929 A1 | 7/2015 | Roberts et al. | |
| 2015/0195931 A1 | 7/2015 | Roberts et al. | |
| 2015/0204985 A1 | 7/2015 | Jonishi et al. | |
| 2015/0327657 A1 | 11/2015 | Roberts et al. | |
| 2015/0370288 A1* | 12/2015 | Dinesh | H04B 1/3888 |
| | | | 455/566 |
| 2016/0285497 A1 | 9/2016 | Roberts et al. | |
| 2016/0352875 A1 | 12/2016 | Roberts et al. | |
| 2016/0359517 A1 | 12/2016 | Roberts et al. | |

FOREIGN PATENT DOCUMENTS

| | | |
|---|---|---|
| EP | 3072412 A1 | 9/2016 |
| EP | 3098901 A1 | 11/2016 |
| WO | WO 02014013770 | 1/2014 |

OTHER PUBLICATIONS

Parylene Properties & Characteristics—download from http://vp-scientific.com/parylene_properties.htm, Sep. 15, 2016, 4 pages.

M. Caruso et al., Solvent-Promoted Self-Healing Epoxy Materials, Macromolecules, 2007, vol. 40, pp. 8830-8832, American Chemical Society, 2007.

* cited by examiner

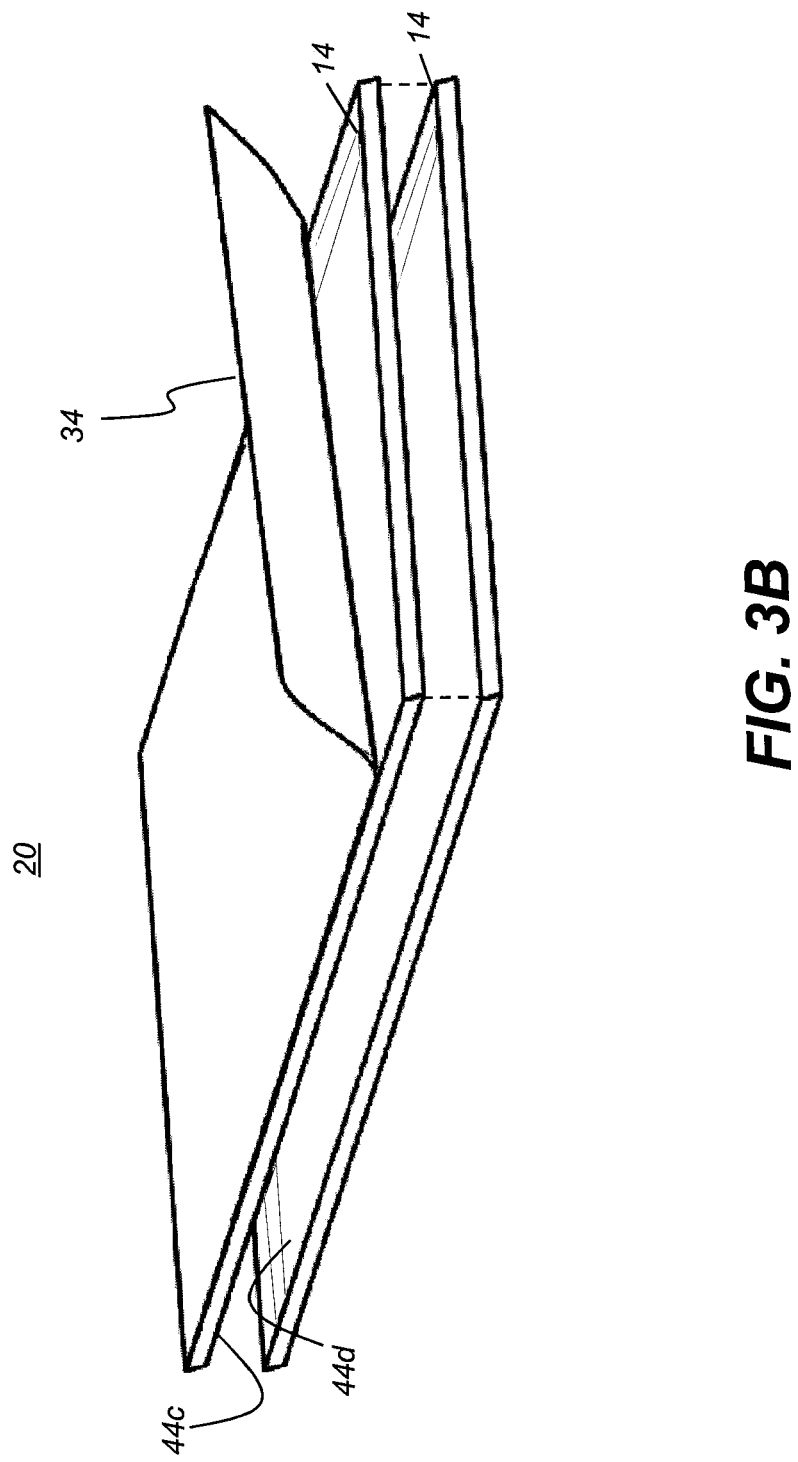

IMPACT PROTECTION FOR WIRELESS DIGITAL DETECTOR GLASS PANEL

CROSS REFERENCE TO RELATED APPLICATIONS

This application is a continuation-in-part of U.S. Pat. No. 9,581,701, issued Feb. 28, 2017, in the name of MacLaughlin, entitled IMPACT PROTECTION FOR WIRELESS DIGITAL DETECTOR GLASS PANEL.

FIELD OF THE INVENTION

The invention relates generally to the field of x-ray imaging and more particularly relates to apparatus and methods for providing impact protection for a portable wireless digital detector.

BACKGROUND

With the advent of portable wireless digital radiography (DR) detectors, significant new opportunities are available for using x-ray imaging in various environments, including medical and dental applications and non-destructive testing (NDT) applications, such as inspection of pipe welds on oil/gas lines and aircraft structures, for example. Hospitals and other healthcare facilities in particular have expanded capability for obtaining x-ray images, including images obtained at the patient bedside. Unlike conventional radiographic image detectors, the wireless DR detectors can be positioned about the patient in a number of positions, without the concern for extending wires between the detector and image acquisition and power electronics. Portability with wireless operation also makes these devices suitable for use in veterinary imaging, since the DR detector can be flexibly positioned and there are no external wires that could be chewed or otherwise damaged during handling and positioning about the subject. It is also possible to use the DR detector in various outdoor environments, under a range of weather conditions for both medical and non-medical applications.

In conventional use as well as in veterinary, outdoor, and industrial and security imaging environments, the portable DR detector can be susceptible to damage in normal handling and use. The DR detector circuitry is formed on, and supported by, a glass panel substrate, or other suitably rigid substrate, that, altogether as an assembly, is encased in a protective housing. Even though the glass panel assembly is carefully packaged and supported within its housing, however, there remains some risk of damage. Some amount of rough handling is possible; the detector may be inadvertently dropped, stepped on, or subject to other shocks, mechanical stresses, point loading, and impact in any of the various environments in which it is operated.

Practical requirements for high portability, low weight, reduced dimensional profile, and versatile use run counter to the need to protect the relatively large glass substrate that supports sensitive circuitry inside the DR detector. Applying conventional approaches for buffering the internal glass panel from any possible type of impact could prevent the DR detector from being usable in one or more of its intended environments or applications. Thus, there is a need to achieve a reasonable balance between usability of the wireless DR panel and protection of its internal components.

SUMMARY

Embodiments of the present disclosure address the need for improved impact protection for a portable wireless DR detector. Advantageously, embodiments of the present disclosure provide an added measure of resiliency to impact without compromising dimensional and weight requirements and without noticeable effect on imaging performance.

These objects are given only by way of illustrative example, and such objects may be exemplary of one or more embodiments of the invention. Other desirable objectives and advantages inherently achieved by the may occur or become apparent to those skilled in the art. The invention is defined by the appended claims.

According to an embodiment of the present disclosure, there is provided a digital radiography detector having a substrate enclosed within a housing and that has, formed on a first surface of the substrate, photosensitive circuitry that provides image data of a subject in response to ionizing radiation passed through the subject, wherein a second surface of the substrate on the exterior of the detector has a flexible multilayer cover sheet that is configured to absorb various impact forces against the detector.

According to another embodiment, there is disclosed, in a digital radiography detector, a housing, photosensitive cells for capturing a radiographic image, and a top side outermost transparent panel, and a transparent multilayer flexible sheet in contact against at least a first major exterior surface of the top side transparent panel and compressed between the edges of the panel and the housing where the panel is secured to the housing.

According to another embodiment, there is disclosed a method for forming a digital radiography detector including forming a detector panel with one or more glass panels, wherein circuitry formed on a first surface of the one or more glass panels is energizable to provide image data of a subject in response to ionizing radiation passed through the subject, and coupling to at least a second surface of the one or more glass panels that is an exterior surface of the detector panel, a flexible multilayer cover sheet that absorbs impact force. The detector panel is enclosed with its cover sheet within a housing.

According to another embodiment, there is provided a method for forming a digital radiographic detector. The method includes forming photosensitive circuitry on a first surface of a substrate. The circuitry is energizable to provide image data of a subject in response to ionizing radiation passed through the subject. A multilayer cover sheet is formed that comprises thermoplastic polyurethane, polyethylene terephthalate, and an adhesive silicone compound. The multilayer cover sheet is attached to a second surface of the substrate and the assembly is enclosed within a housing.

This brief summary of the invention is intended only to provide a brief overview of subject matter disclosed herein according to one or more illustrative embodiments, and does not serve as a guide to interpreting the claims or to define or limit the scope of the invention, which is defined only by the appended claims. This brief summary is provided to introduce an illustrative selection of concepts in a simplified form that are further described below in the detailed description. This brief summary is not intended to identify key features or essential features of the claimed subject matter, nor is it intended to be used as an aid in determining the scope of the claimed subject matter. The claimed subject matter is not limited to implementations that solve any or all disadvantages noted in the background.

For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The drawings below are intended to be drawn neither to any precise scale with respect to relative size, angular relationship, relative position, or timing relationship, nor to any combinational relationship with respect to interchangeability, substitution, or representation of a required implementation.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 3B is a perspective view that shows adhesive application of a cover sheet to the glass panel for a detector panel that is formed from multiple glass panels.

DETAILED DESCRIPTION OF THE EMBODIMENTS

Figure 1:
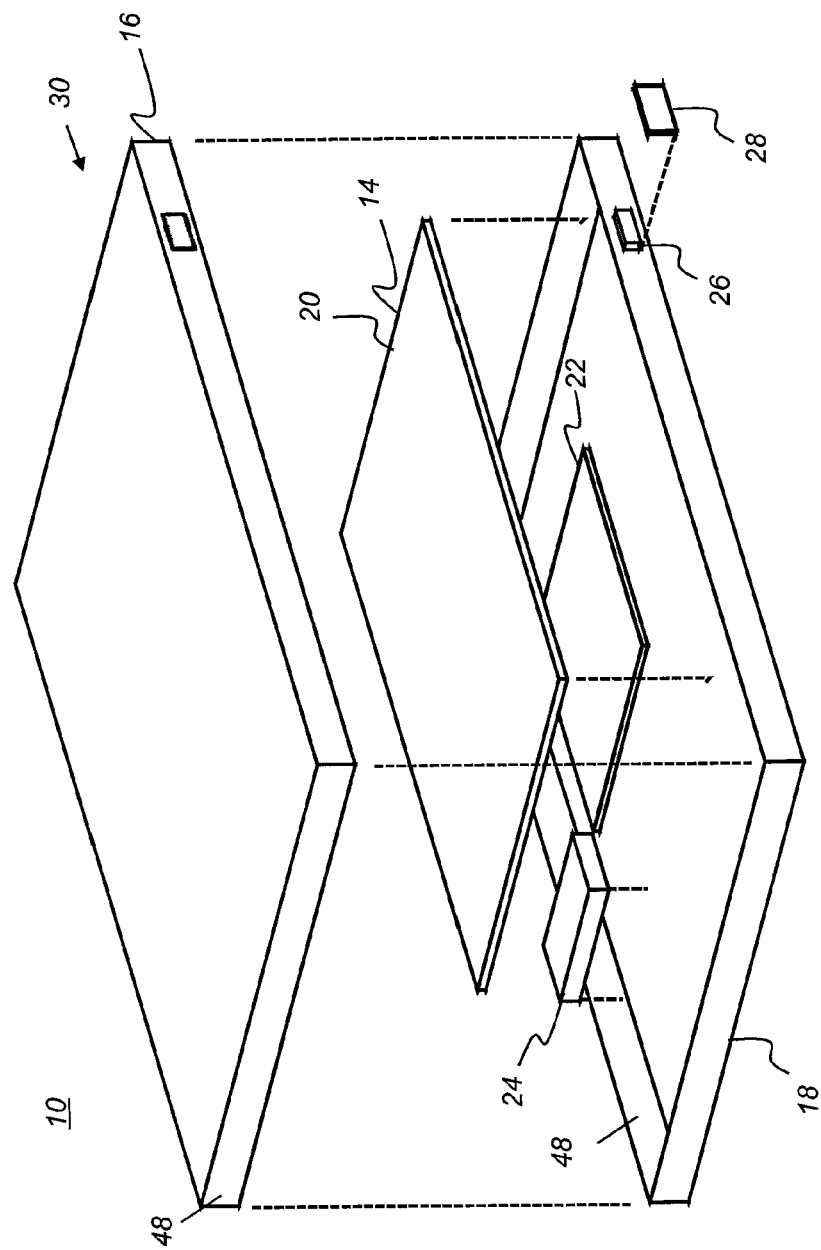
FIG. 1 is an exploded view that shows some of the components of a digital radiography (DR) detector.

The following is a detailed description of the preferred embodiments, reference being made to the drawings in which the same reference numerals identify the same elements of structure in each of the several figures. Where they are used herein, the terms "first", "second", and so on, do not necessarily denote any ordinal, sequential, or priority relation, but are simply used to more clearly distinguish one element or set of elements from another, unless specified otherwise. As used herein, the term "energizable" relates to a device or set of components that perform an indicated function upon receiving power and, optionally, upon receiving an enabling signal. The term "actuable" has its conventional meaning, relating to a device or component that is capable of effecting an action in response to a stimulus, such as in response to an electrical signal, for example. In the context of the present disclosure, the term "subject" refers to the patient or other object that is being imaged using a radiography imaging apparatus and, in optical terms, can be considered equivalent to the "object" of the corresponding imaging system. Various spatially relative terms such as "above," "below," "top," "bottom," "height," "depth," "width," and "length," etc. may be used in the present disclosure to facilitate description of various embodiments. The relative terms are defined with respect to a conventional orientation of a structure as described and do not necessarily represent an actual orientation of the structure in manufacture or use. The use of such terms in following detailed description is, therefore, not to be taken in a limiting sense.

The exploded view of FIG. 1 shows, in simplified form, some of the electrically active internal components of a DR detector 10 that are protected within a housing 30 formed using top and bottom covers 16 and 18. A detector panel 20 formed on one or more glass sections or glass panels 14 includes scintillator and imaging components that are energizable for generating image data from received ionizing radiation. A circuit board 22 provides supporting components for data acquisition and wireless transmittal to an external host processor. A battery 24 provides source power for detector 10 operation. An external port 26 is provided for functions such as wired data transfer and battery charging and has an optional cover plate 28, which may be a rubber seal or other waterproofing material. In addition to components shown are also a number of interconnecting cables, supporting fasteners, cushioning materials, and other elements needed for packaging and protecting the DR detector circuitry. Housing covers 16 and 18 are fastened together along mating surfaces 48, for example.

Figure 2:
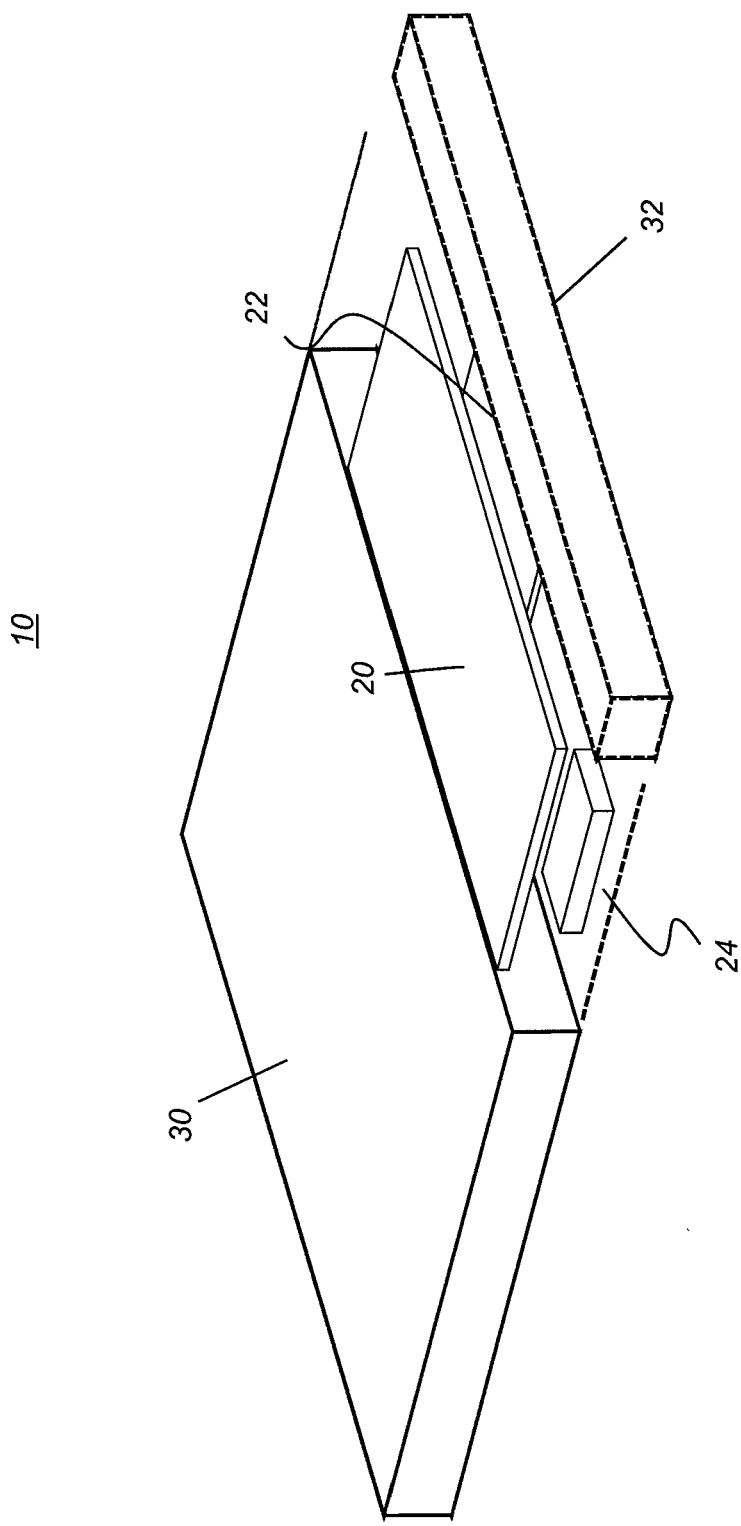
FIG. 2 is an exploded view that shows an alternate embodiment for DR detector packaging.

The exploded view of FIG. 2 shows an alternate embodiment of DR detector 10, in which detector panel 20, circuit board 22, and battery 24, along with interconnection and other support components, slide into a housing 30. A lid 32 then fastens to housing 30, such as being inserted into the housing 30, for example, and provides a protective seal.

Detector panel 20 has one or more substrate sections, glass panels 14, of silicate glass or other silicon-based material upon which the sensing circuitry for detecting incident radiation is formed as an array of sensing elements. Sensing circuitry can be, for example, thin-film transistor (TFT) structures that are formed by depositing patterns of charge-doped materials onto the glass substrate. Circuitry can be formed on an inner surface of glass panel 14 or on an external or exterior surface. Exemplary disclosures that describe various aspects of DR detector panel 20 include commonly assigned U.S. Patent Application Publication No. 2013/0220514 by Jagannathan et al., entitled "Method of Manufacturing Digital Detectors"; U.S. Patent Application Publication No. 2011/0024642 by Tredwell et al., entitled Radiographic Detector Formed on Scintillator"; and U.S. Pat. No. 8,569,704 to Tredwell, entitled "Digital Radiographic Detector Array Including Spacers and Methods for Same". In the context of the present disclosure, treatment applied to exterior glass panel 14 surfaces is considered equivalent to treatment provided to detector panel 20 surfaces, since detector panel 20 can be formed from one or more adjacently disposed glass panels 14. Circuitry and scintillator material can be protectively sandwiched between two or more adjacent glass panels 14, for example.

Figure 3A:
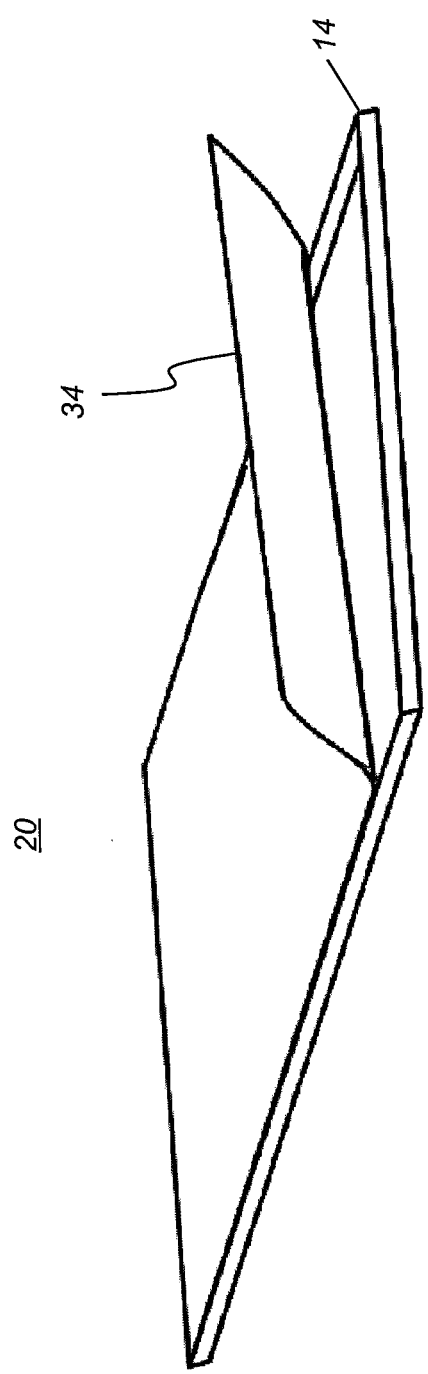
FIG. 3A is a perspective view that shows adhesive application of a cover sheet to the glass panel.
Figure 4:
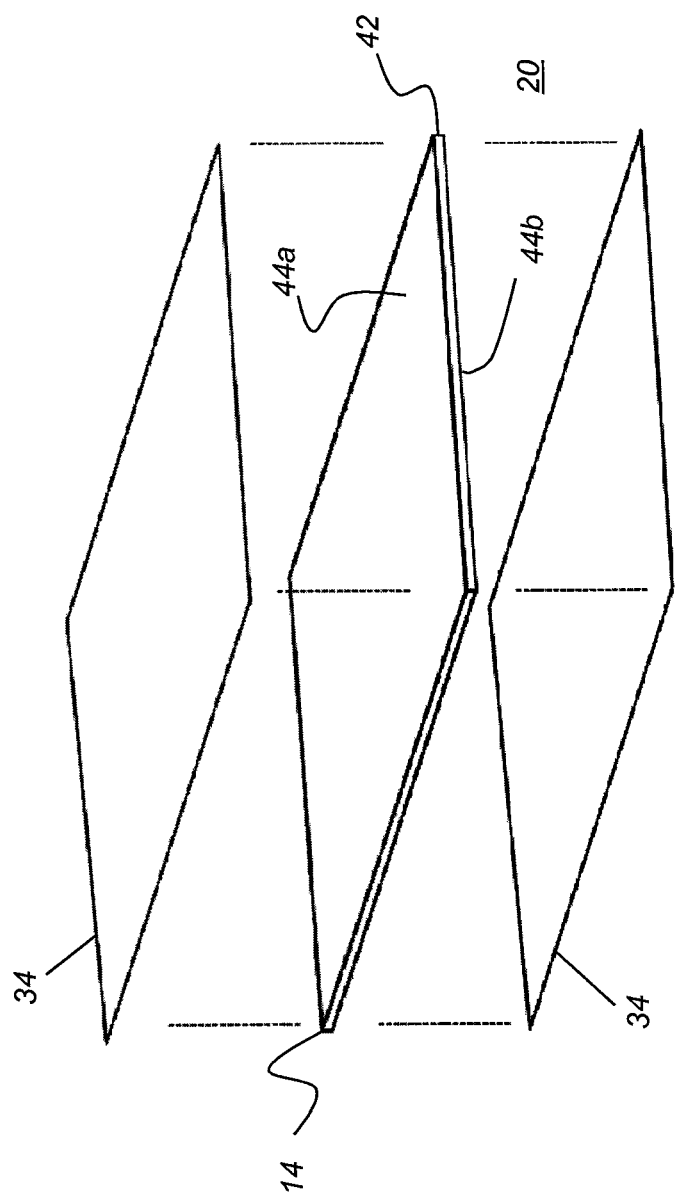
FIG. 4 is a perspective view that shows application of two cover sheets to respective surfaces of the glass panel that holds DR detector circuitry.

An embodiment of the present disclosure provides a measure of impact protection to one or more exterior surfaces of glass panel 14 of the detector panel 20 by applying an impact-absorbing covering in the form of a sheet, or multiple sheets, that is positioned directly against a major exterior surface of glass panel 14 surface or adhesively coupled to the exterior glass panel 14 surface. Referring to the perspective views of FIGS. 3A-3B, there is shown a cover sheet 34 that is being adhesively coupled to glass panel 14 on an exterior surface of detector panel 20. Cover sheet 34 may be adhered to glass panel 14 wherein detector 20 is formed from two or more adjacently disposed glass panels, such as a first glass panel that has detector circuitry on an inner surface 44c and a second glass panel that has a layer of scintillator material on an inner surface 44d, facing the circuitry surface, for example. A side portion of cover sheet 34 is shown raised in FIGS. 3A and 3B. The exploded view of FIG. 4 shows application of upper and lower cover sheets 34, one on each major surface 44a and 44b of exterior surfaces of detector panel 20. Major exterior surfaces 44a and 44b are those opposite, outside surfaces of detector panel 20 that are parallel to the plane of the glass that forms the detector, as the term "plane" is generally understood in practice. This plane is also parallel to the imaging plane.

Figure 5:
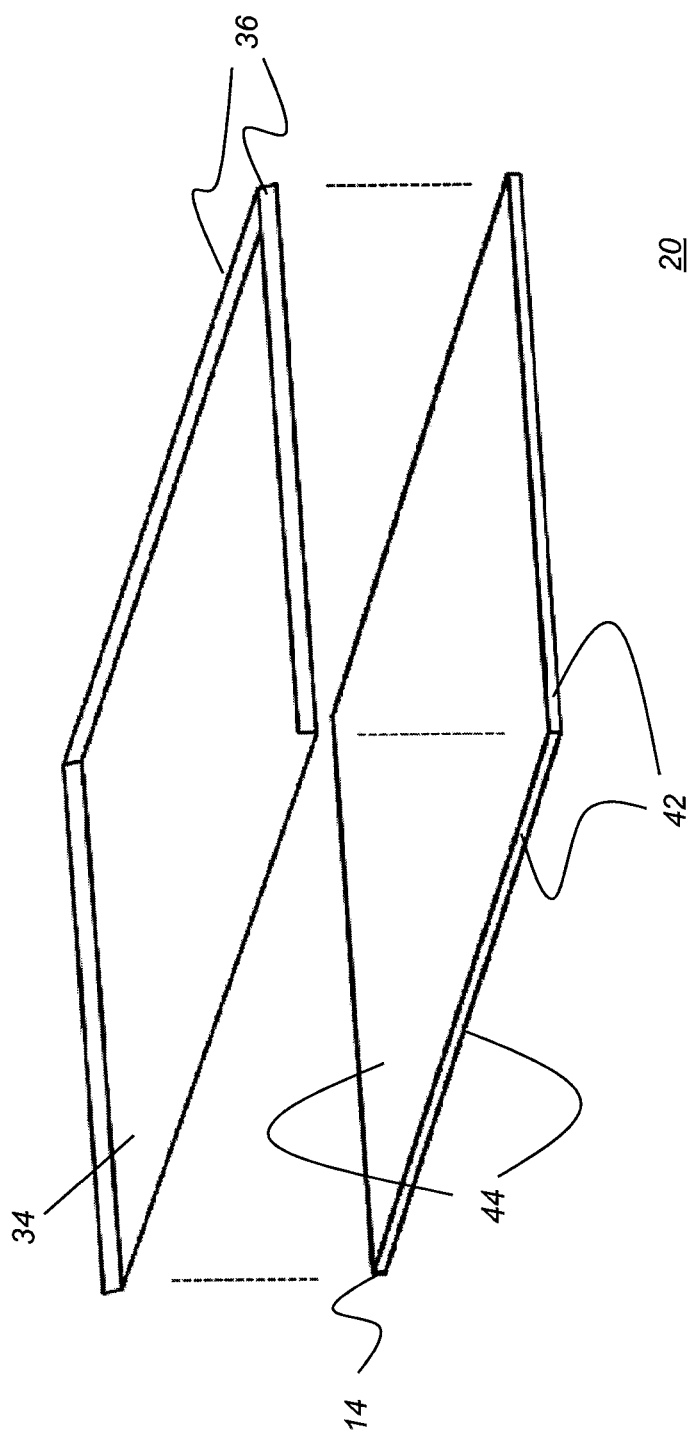
FIG. 5 is a perspective view showing a cover sheet with folds for covering side edges.
Figure 6:
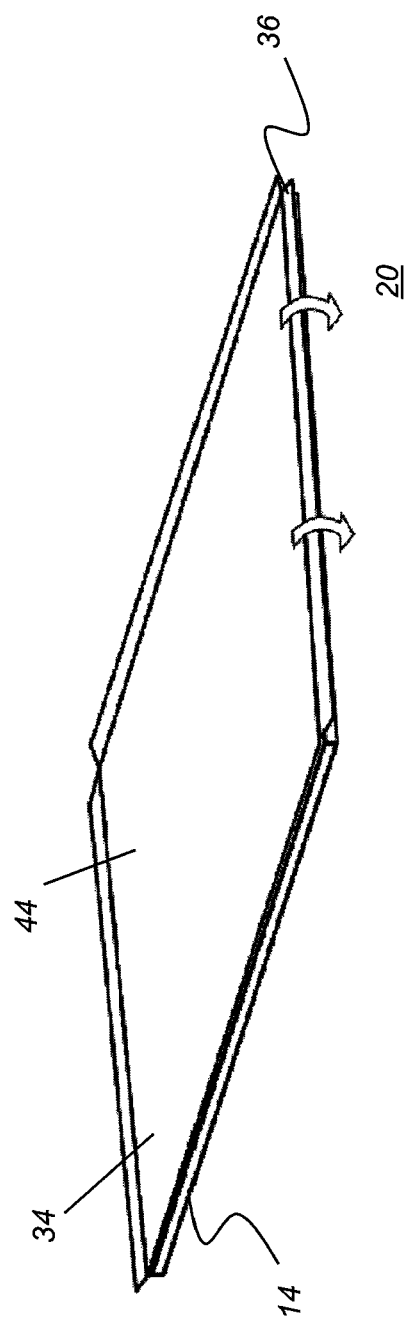
FIG. 6 is a perspective view showing a cover sheet with folds configured for covering a side edge.

Cover sheet 34 may also wrap around glass panel 14, including both major exterior surfaces 44a and 44b and around narrow edges 42. As shown in the perspective exploded view of FIG. 5, a single continuous cover sheet 34 can have one or more regions folded into flaps 36 that fold down over edges 42 of glass panel 14 to protect these edges of the detector panel 20 from impact. FIG. 6 shows, using arrows, one of the flaps 36 being folded downward to cover one edge of panel 14 after the front or rear major exterior surface 44 of detector panel 20 that is parallel with the imaging plane has been covered.

It can be readily appreciated that there are a number of options and configurations for adhering or otherwise coupling cover sheet 34 against one or more exterior surfaces of glass panel 14 of detector panel 20. Contact adhesive can be used, along with smoothing techniques for removal of trapped air bubbles. Other types of adhesive can be employed, including adhesives that are applied to the surface of cover sheet 34 or to the surface of glass panel or to both surfaces. Adhesives that are heat-cured or light-cured can also be utilized, provided that the heat or light energy applied for curing is not deleterious to detector panel 20 circuitry. Cover sheet 34 can alternately be applied as a type of coating, such as by spraying, rolling, or smoothing with a blade, for example. The applied coating is then cured to form a covering over the surface; curing can use heat or light energy, or curing in air, for example. Cover sheet 34 can alternately be fitted along edges where detector panel 20 is secured to the housing, such as compressed between the edges of the panel and the housing where the panel is secured to the housing.

Cover sheet 34 can be formed from a multilayer polymer material that has a top layer that is sufficiently rigid to spread impact force along the plane of the cover sheet 34; a middle layer that comprises an impact absorbing polymer, such as a material that is used in fabrication of aircraft cockpit glass or bullet-proof glass, for example; and a bottom layer for use closest to the glass panel 14 surface, formed from a soft polymer that dampens impact force and absorbs impact energy. The middle layer can be BulletShield™ impact absorbing polymer manufactured by BASF of Ludwigshafen, Germany, for example. Other layers can be added, formed from similar or different materials as needed. One example of a type of protective cover sheet that can be used is the Impact Shield from Tech21, London, UK.

Advantageously, cover sheet 34 does not need to be transparent to visible light and can be opaque, blocking visible light. The polymer materials used should have low density so that they provide negligible attenuation to the x-ray radiation.

According to an alternate embodiment of the present disclosure, cover sheet 34 is pressed against the surface of glass panel 14 of detector panel 20 without adhesive coupling. Mechanical pressure is applied against cover sheet 34 at various points. Protective cover sheet 34 can be compressed between edges of the glass panel 14 and housing 30, for example.

According to an alternate embodiment of the present disclosure, cover sheet 34 is positioned between detector circuitry on detector panel 20 and the scintillator layer or layers that generate light in response to received radiation energy. In this case, cover sheet 34 is made from a material that is transparent to the wavelengths of light that are emitted from the scintillator.

Other methods for reducing the likelihood of impact damage include treatment of edge surfaces of the glass substrate following a glass-cutting operation used to fabricate the glass substrate. Glass cutting is generally performed as an early fabrication step, prior to forming the circuitry on the substrate. The glass is scored with a scribing tool, typically of diamond or carbide composition, forming a shallow linear crack along the glass surface. Bending is then used to propagate the linear crack through the width of the glass plate to break the glass in along the scoring. Cutting glass typically results in some damage along the edges of the glass, in the form of tiny cracks, or microcracks, that can be barely visible even under low magnification. Characteristics of microcracks from glass cutting are described, for example, by R. A. Allaire and T. Ono in a Technical Information Paper from Corning, Inc. entitled "Fracture Analysis of the Glass Scoring Process", November 2004, currently available online as filename TIP_308.pdf.

One concern with microcracks is that these small cracks potentially form nuclei for larger cracks that extend from the edges inward along the glass panel 14. Continued loading and cycling due to thermal, mechanical, and vibration effects can tend to cause these tiny cracks to propagate further along the glass plate, eventually resulting in a crack that could damage detector panel 20 circuitry.

Conventional strategies for preventing or healing microcracks along the edges of a cut glass plate include grinding and polishing. While these methods can help to reduce problems related to microcracks, they can also tend to have unintended side-effects, such as adding particulate glass and abrasive materials to the glass major surface on which circuitry is formed. Static charge introduced as a side-effect of the polishing process can also be detrimental, causing the surface to attract and hold unwanted particulate material. The added step of finishing glass edges in conventional ways can thus have disappointing results and can be time-consuming and costly.

Figure 7:
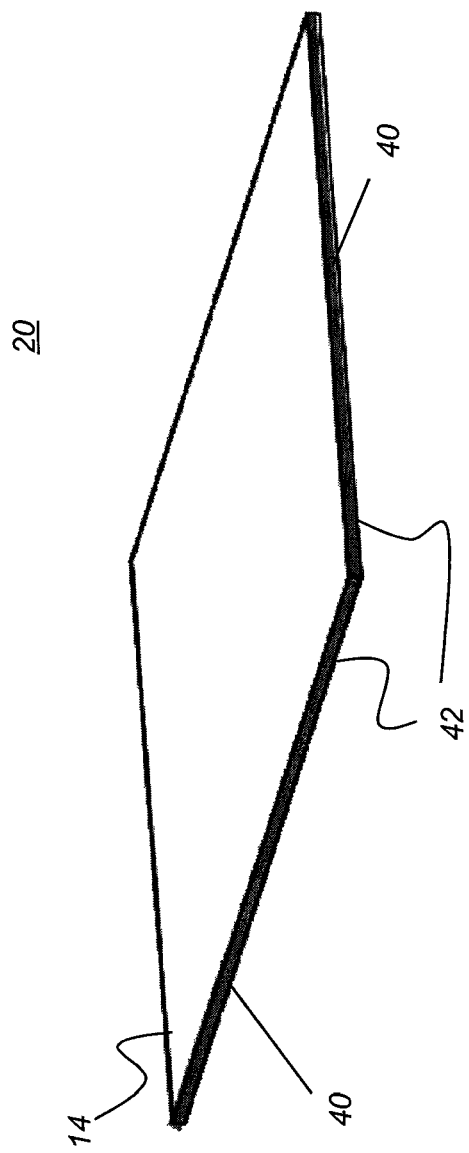
FIG. 7 is a perspective view that shows a glass plate with a protective edge treatment.

An embodiment of the present disclosure addresses the problem of edge microcracks by applying a sealant or filler material to the edges of the glass sheet that is used to form glass panel 14. The sealant or filler material can be applied to one or more edges of the glass sheet, such as along edges formed by glass cutting, or can be applied to all edges of the glass sheet. The perspective view of FIG. 7 shows glass panel 14 with a filler 40 applied along at least two edges 42.

Filler 40 can be any of a number of materials that penetrate microcracks, bond to the glass, and help to forestall the spreading of surface faults from microcracks. Suitable filler 40 materials include, but would not be limited to, epoxy resins. Epoxy resins, also termed polyepoxides, are a well-known class of reactive prepolymers and polymers which contain epoxide groups. In curing, these materials form a strong polymer bond that reduces the likelihood of fracture spreading in glass.

Epoxy resins cure or harden by cross-linking. These resins are typically provided in two-part formulations, with the epoxy material that is mixed before application with a co-reactant, also termed a curative or hardener. Some typical co-reactants used for this purpose include polyfunctional amines, acids (and acid anhydrides), phenols, alcohols, and thiols. Alternately, epoxy resins can be a single-part formulation, cross-linked by homopolymerisation. Curing can be facilitated by exposure to air or exposure to light energy, including ultraviolet (UV) illumination.

Methods for treatment of holes or defects in the glass surface itself, using epoxy or similar materials, are known and described, for example in U.S. Pat. No. 3,562,366 to Sohl entitled "Method of repairing windshields"; and in U.S. Pat. No. 3,914,145 to Forler et al. entitled "Method and Apparatus for Repairing Cracks in Plate Glass".

Unlike windshield or other glass applications, the filler material that is applied for treating edges of glass panel 14 need not be transparent. Application of filler 40 (FIG. 7) along the one or more cut edges 42 can be by roller, dipping, spraying, tube application, applying a bead of the material, or using a blade or other structure. Filler 40 can be compressed against the treated edges and surface during or following application, so that the material fills voids, microcracks, and defects in the cut glass structure.

According to an embodiment of the present invention, an epoxy resin and suitable hardener are mixed and deposited within a tray. The edges of cut glass panel 14 are fed through the tray for acquiring a coating of the epoxy. The coated glass panel 14 is then dried and the epoxy is cured under UV illumination.

Advantageously, the use of filler 40 can help to reduce the likelihood of crack spreading through glass panel 14 because of microcracks or other problems caused in glass cutting and sizing. Other types of filler 40 can be used, including silicones and other materials. So-called "self-healing" materials can alternately be used for filler 40. Self-healing materials include various types of polymer and composite materials that exhibit some level of capability for automatic molecular-level realignment in response to fracture or other damage.

According to an embodiment of the present disclosure, there is provided a method comprising cutting a glass section from a supply glass panel; applying a liquid filler to at least the edges of the glass section formed by the step of cutting; and allowing the liquid filler to penetrate microcracks in the edges of the glass section over a period of time, including curing the liquid filler. After curing, the glass section is inserted into a detector housing, wherein the detector housing is in contact against one or more edges of the glass section.

Filler 40 can be used prior to the fabrication of circuitry onto glass panel 14. Alternately, filler 40 can be added to glass panel 14 after the deposition of thin-film transistor (TFT) or other circuit-forming materials.

Figure 8:
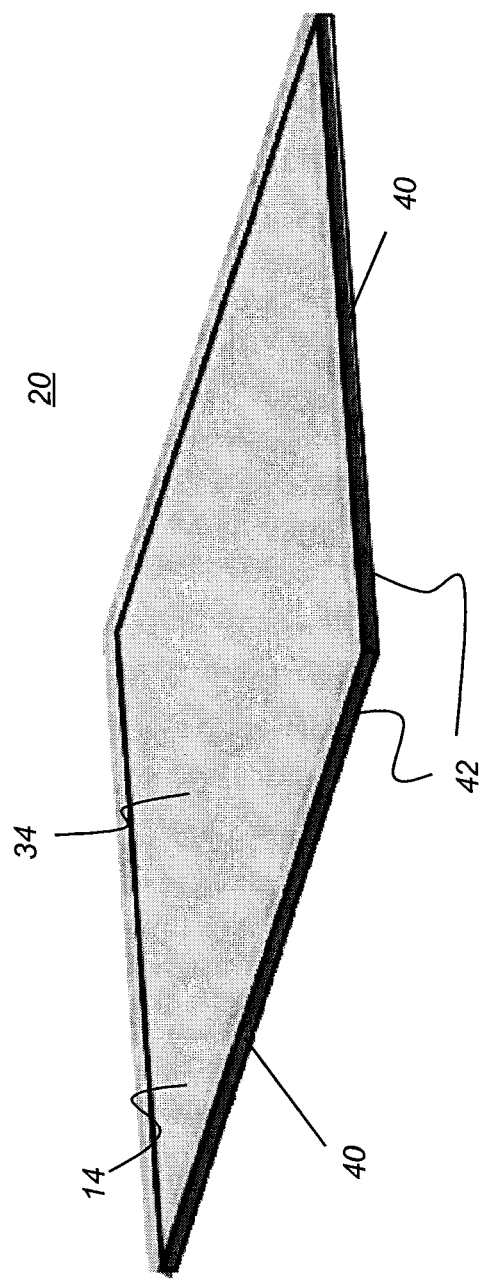
FIG. 8 is a perspective view of a DR detector in which a glass plate has both an edge treatment and a cover sheet.

Methods for edge treatment and surface treatment of detector panel 20 can be combined in order to provide enhanced protection from handling and impact damage. The perspective view of FIG. 8 shows glass panel 14 that has an applied cover sheet 34 and has then been treated along cut edges 42 using an epoxy-based filler.

Figure 9:
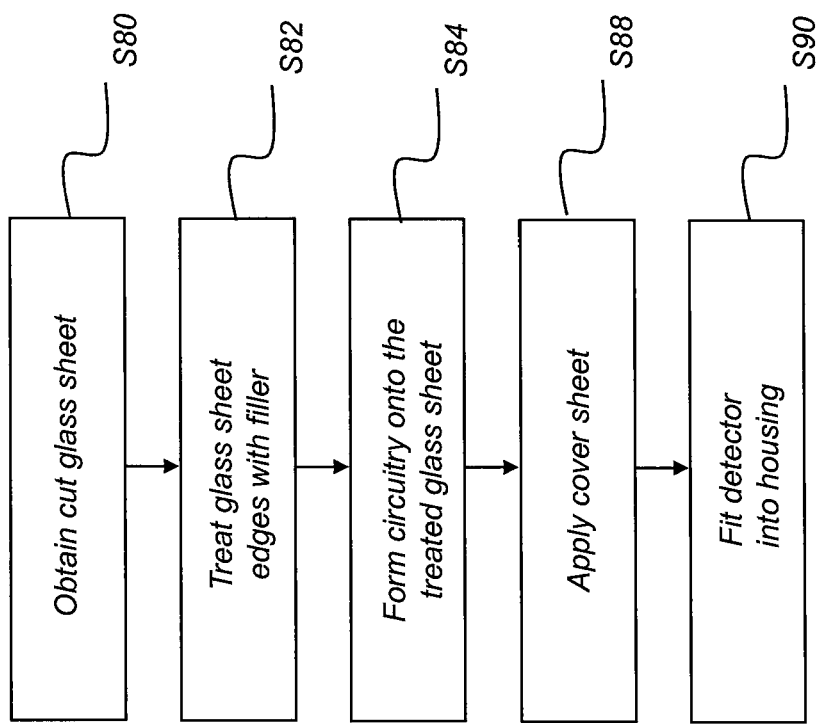
FIG. 9 is a logic flow diagram that shows processes in a sequence for forming and protecting a DR detector according to an embodiment of the present invention.

The logic flow diagram of FIG. 9 shows processes in a sequence for forming and protecting a DR detector according to an embodiment of the present invention. In an initial step S80, a cut glass sheet is obtained for use as a surface substrate in the DR detector. In an edge treatment step S82, an epoxy-based or other filler is used to treat the cut glass sheet. The filler is applied along at least one cut edge of the glass sheet. A circuit forming step S84 is then executed, forming circuitry onto the edge-treated glass sheet. The scintillator layer is then applied to the circuitry. An application step S88 then applies a cover sheet onto one or more surfaces of the detector. A fitting step S90 then packages the DR detector into a housing, as was shown earlier with respect to FIGS. 1 and 2.

Figure 10:
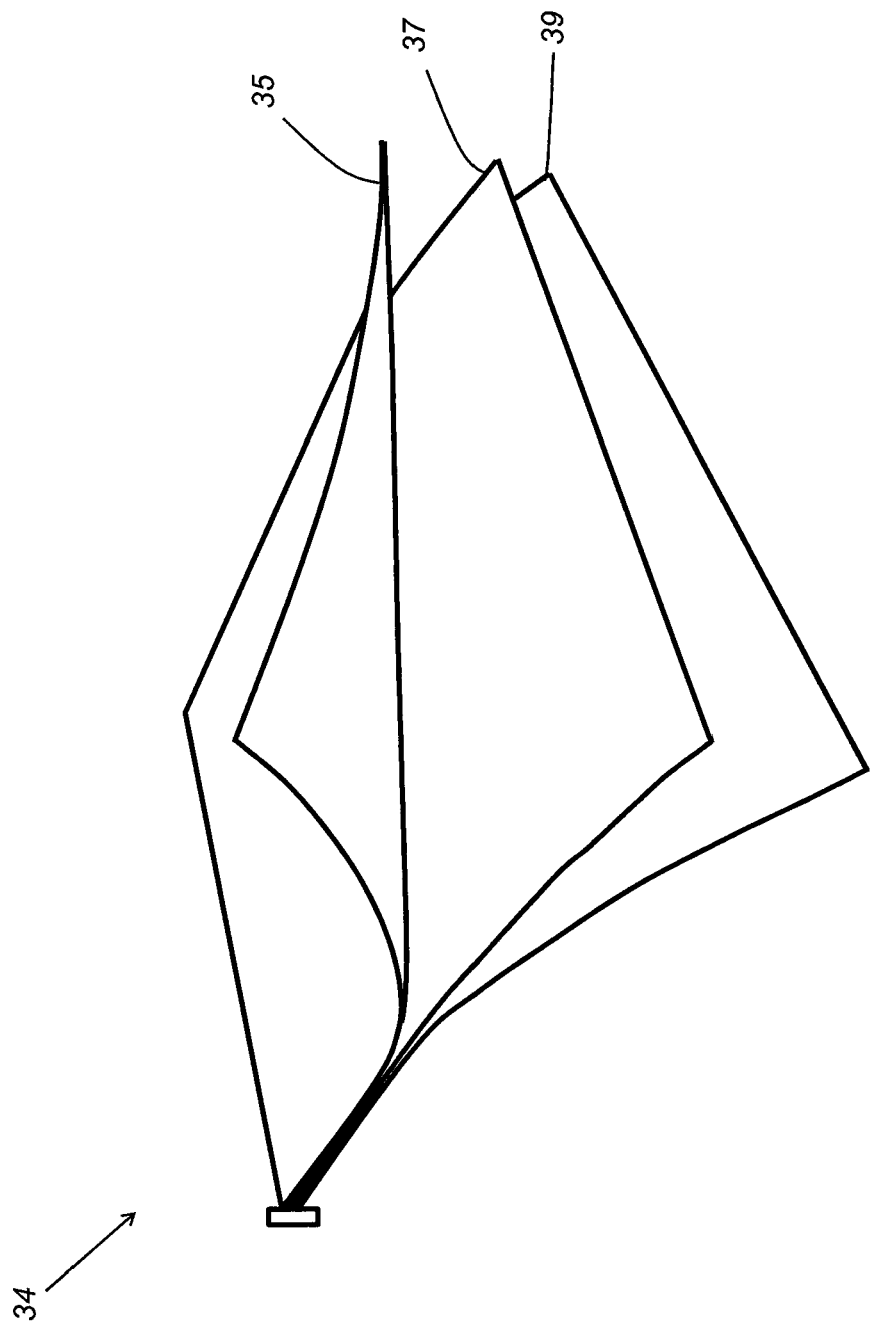
FIG. 10 illustrates a protective cover sheet formed from three layers.

In one multilayer embodiment, as illustrated in FIG. 10, the different layers 35, 37, 39 forming the protective cover sheet 34 are illustrated. Material properties of the three layers 35, 37, 39, may each provide a different form of protective property for the glass substrate. The top layer 35 may be fabricated using a selected material demonstrating resistance to scratches, oil, grease, solvents, and other chemicals, as it is the outermost layer and so may be subjected to various surface damage caused by impacts or other contact with the environment. The resistance to solvents may be demonstrated by the material not being consumed, made softer, a smooth shiny material surface becoming roughened or pocked, weakened, clouded, or otherwise physically deteriorated by the solvents. In one embodiment, the top layer 35, may also be selected to survive an impact itself, but may not provide sufficient impact protection for the detector panel underneath. This property may be used to maintain a seal as between an exterior environment and an interior of the detector. The top layer 35 may be selected from materials that maintain their initial cosmetic appearance over time. In one embodiment, the top layer 35 may include polyester TPU, which is a thermoplastic polyurethane—a chemically enhanced plastic whose properties include scratch resistance, elasticity, resistance to oil and grease (oleophobic), solvents, chemicals, and increased toughness. Since the material is elastic, it includes self healing properties. A self healing property indicates that its softness demonstrates an ability to absorb non-extreme impact, such as being dropped from slight heights, and scratches while retaining all or most of its original composition. The scratches may initially leave a crease, cut, incision, slice, or nick in the soft plastic, but over time it may slowly return to normal (i.e. self-heal).

In one embodiment, an outer layer, such as top layer 35, may include tempered glass that is formed under a controlled process using controlled thermal or chemical treatments to increase its strength compared to normal glass. Tempering puts the outer surfaces into compression and inner surfaces in tension. Its compressive strength is typically in the range of about 10,000-15,000 psi. The compressive stress gives the tempered glass increased strength. Scratch resistance typically starts at about 6H and may reach 8H to 9H on the Mohs hardness scale; and it is resistant to oil and grease (oleophobic), solvents, and chemicals. In one embodiment, in the event of a severe drop or other impact, the protective outer layer may be designed as a sacrificial layer to absorb the impact and break into small harmless shards, while protecting the detector panel.

The middle layer 37 may be selected from materials that are adequately stiff to distribute an impact load across the largest possible cross-section area to reduce force per unit surface area of the layer. In one embodiment, the middle layer 37 may include PET (polyethylene terephthalate)—a structurally stiff, rigid, impact absorbing, and shatterproof layer to distribute energy from an impact across a wider surface area. The PET may be easily scratched so it may not perform optimally as an outer layer, such as for top layer 35.

Another outer layer, such as bottom layer 39, may be selected from materials that serve to bond the top and middle layers 25, 37, to the detector panel, such as the glass panel 14, while providing energy absorption and dissipation across the detector panel. Thus, the bottom layer 39 serves a dual purpose—it not only serves as an adhesive layer, but is also used to provide added contact shock or impact protection. In one embodiment, the bottom layer 39 may include adhesive silicone in a gel consistency formulated to conform to any irregularities in the detector panel surface, thereby maximizing the surface area available to dissipate impact loads received through the top and middle layers 35, 37. The layers 35, 37, 39, may be compressed, laminated, or have a thin layer of adhesive applied therebetween to form protective cover sheet 34.

Silicone molecules of the bottom layer 39 are helical and their intermolecular force is low, resulting in high elasticity and high compressibility. The elasticity and compressibility properties allow the silicone to flow when under load, thereby absorbing and evenly distributing the imparted impact load over a larger cross sectional area. The high binding energy of the siloxane bonds that form the silicone are highly stable compared to common organic polymers, resulting in high heat and cold resistance, good weatherability, and radiation resistance. As described herein, impact loads may include a drop impact as a detector is dropped onto a hard floor. Dissipation of energy may refer to avoidance of a single point impact load by distributing the impact force over a larger area.

In one embodiment, the top layer 35, which may be an outermost exterior layer of an imaging detector, may be formed of antimicrobial materials, which would provide a benefit in a human or animal radiographic imaging environment where transfer of bacteria from one person to another is a concern. Naturally occurring antimicrobial materials that may be combined into the top layer 35 include elemental ions such as silver salts, metallic copper, controlled-ion released, and nano-based materials. Synthetic chemicals may include polyhexamethylene biguanide, sulphonamides, and fluoroquinolones. These materials may be combined into the top layer by being coated on or embedded in the top layer material to make it antimicrobial.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A digital radiography detector comprising:
   a housing;
   photosensitive circuitry within the housing to generate radiographic images of a subject;
   a glass panel secured over the photosensitive circuitry by the housing; and
   a multilayer cover sheet configured to be attached to an exterior surface of the glass panel, the cover sheet comprising a top layer being rigid to spread the impact force, a middle layer having an impact absorbing polymer, and a bottom layer attached to the glass panel having a soft polymer to absorb impact energy,
   wherein the multilayer cover sheet is configured as a unitary sheet, the top layer abuts, and is coextensive with, the middle layer, and wherein the middle layer abuts, and is coextensive with, the bottom layer.

2. The detector of claim 1, wherein the top layer comprises tempered glass.

3. The detector of claim 2, wherein the top layer comprises a hardness at least about 6H on the Mohs hardness scale.

4. The detector of claim 2, wherein the top layer is configured as a sacrificial layer to shatter upon impact.

5. The detector of claim 1, wherein the top layer comprises a self-healing material.

6. The detector of claim 5, wherein the top layer comprises a thermoplastic polyurethane.

7. The detector of claim 6, further comprising an adhesive only on a surface of the bottom layer facing away from the middle layer to attach the multilayer cover sheet to the glass panel.

8. The detector of claim 7, wherein the adhesive and the cover sheet comprise radiolucent materials.

9. The detector of claim 8, wherein the cover sheet is opaque to visible light.

10. The detector of claim 9, wherein the cover sheet extends over side surfaces of the glass panel, the side surfaces perpendicular to the exterior surface.

11. The detector of claim 6, wherein the middle layer comprises a stiff shatterproof layer.

12. The detector of claim 11, wherein the middle layer comprises polyethylene terephthalate.

13. The detector of claim 12, wherein the top layer comprises an antimicrobial material.

14. A digital radiography detector comprising:
   a substrate enclosed within a housing;
   a scintillator layer within the housing, the scintillator layer for generating light in response to ionizing radiation impacting the scintillator layer;
   circuitry on an interior surface of the substrate that generates image data of a subject in response to the ionizing radiation passed through the subject; and
   a flexible multilayer cover sheet between the scintillator layer and the circuitry, the cover sheet configured to absorb impact force against the cover sheet, the multilayer cover sheet comprising:
      a top layer comprising thermoplastic polyurethane;
      a middle layer comprising polyethylene terephthalate; and
      a bottom layer comprising an adhesive silicone compound.

15. The detector of claim 14, wherein the adhesive and the multilayer cover sheet comprise radiolucent materials.

16. The detector of claim 15, wherein the multilayer cover sheet extends over side surfaces of the substrate, the side surfaces substantially perpendicular to the exterior surface.

* * * * *